United States Patent [19]

Liao

[11] Patent Number: 5,683,195

[45] Date of Patent: Nov. 4, 1997

[54] FOLDABLE FRAME ASSEMBLY

[75] Inventor: Gordon Liao, Tainan Hsien, Taiwan

[73] Assignee: Unique Product & Design Co., Ltd., Tainan Hsien, Taiwan

[21] Appl. No.: 708,285

[22] Filed: Sep. 6, 1996

[51] Int. Cl.$^6$ .................................................. F16D 1/108
[52] U.S. Cl. .......................... 403/102; 403/92; 280/646; 280/DIG. 6
[58] Field of Search ................................ 403/102, 101, 403/98, 92, 95, 91, 84, 326, 325; 280/DIG. 6, 646, 655

[56] References Cited

U.S. PATENT DOCUMENTS

| | | | |
|---|---|---|---|
| 4,121,605 | 10/1978 | Schmerl | 403/95 X |
| 5,106,117 | 4/1992 | Wang | 403/95 X |
| 5,244,228 | 9/1993 | Chiu | 403/101 X |
| 5,288,099 | 2/1994 | Wu | 280/646 |
| 5,464,238 | 11/1995 | Wu | 280/DIG. 6 X |
| 5,496,054 | 3/1996 | Wu | 280/DIG. 6 X |
| 5,582,372 | 12/1996 | Wu | 280/DIG. 6 X |
| 5,605,409 | 2/1997 | Haut et al. | 403/102 |

*Primary Examiner*—Harry C. Kim
*Attorney, Agent, or Firm*—Pro-Techtor International

[57] ABSTRACT

A foldable frame assembly comprises a first frame, a second frame, a coupler, a hollow bracket, a ferrule, a hollow snap fastener, and a socket pipe. The socket pipe is disposed on the lower end of the first frame. The socket pipe has a plurality of round holes. A hollow press plate is fastened on the lower end of the first frame. The hollow press plate has a snap hole and a bevel. The ferrule is disposed on the hollow bracket. The hollow snap fastener is inserted in the ferrule. An elastic element is inserted in the hollow snap fastener. A hollow seat is inserted in the hollow bracket beneath the elastic element. The upper end of the second frame is inserted in the hollow seat. The coupler has a slot and two parallel lugs. A plurality of through holes are formed on the coupler. An upper portion of the second frame is inserted through the slot. The socket pipe is positioned between the parallel lugs.

6 Claims, 7 Drawing Sheets

FOLDABLE FRAME ASSEMBLY

BACKGROUND OF THE INVENTION

The invention relates to a foldable frame assembly. More particularly, the invention relates to a foldable frame assembly for a golf trolley and a running exerciser.

There are many types of foldable frame devices. The foldable frame devices can be disposed on all kinds of pushcarts such as strollers and golf trolleys. The foldable frame devices can be disposed on many kinds of exercisers such as running exercisers and rowing exercisers.

SUMMARY OF THE INVENTION

An object of the present invention is to provide a foldable frame assembly which can be operated easily.

Accordingly, a foldable frame assembly comprises a first frame, a second frame, a coupler, a hollow bracket, a ferrule, a hollow snap fastener, and a socket pipe. The first frame has a lower end. The socket pipe is disposed on the lower end of the first frame longitudinally. The socket pipe has a plurality of round holes. A hollow press plate is fastened on the lower end of the first frame horizontally. The hollow press plate has a snap hole and a bevel. The ferrule is disposed on the hollow bracket. The hollow snap fastener is inserted in the ferrule. A hollow seat is inserted in the hollow bracket. The second frame has an upper end. The upper end of the second frame is inserted in the hollow seat. The coupler has a slot and two parallel lugs. A plurality of through holes are formed on the coupler. An upper portion of the second frame is inserted through the slot. The socket pipe is positioned between the parallel lugs. The hollow snap fastener is inserted in the snap hole.

DETAILED DESCRIPTION OF THE INVENTION

Figure 1:
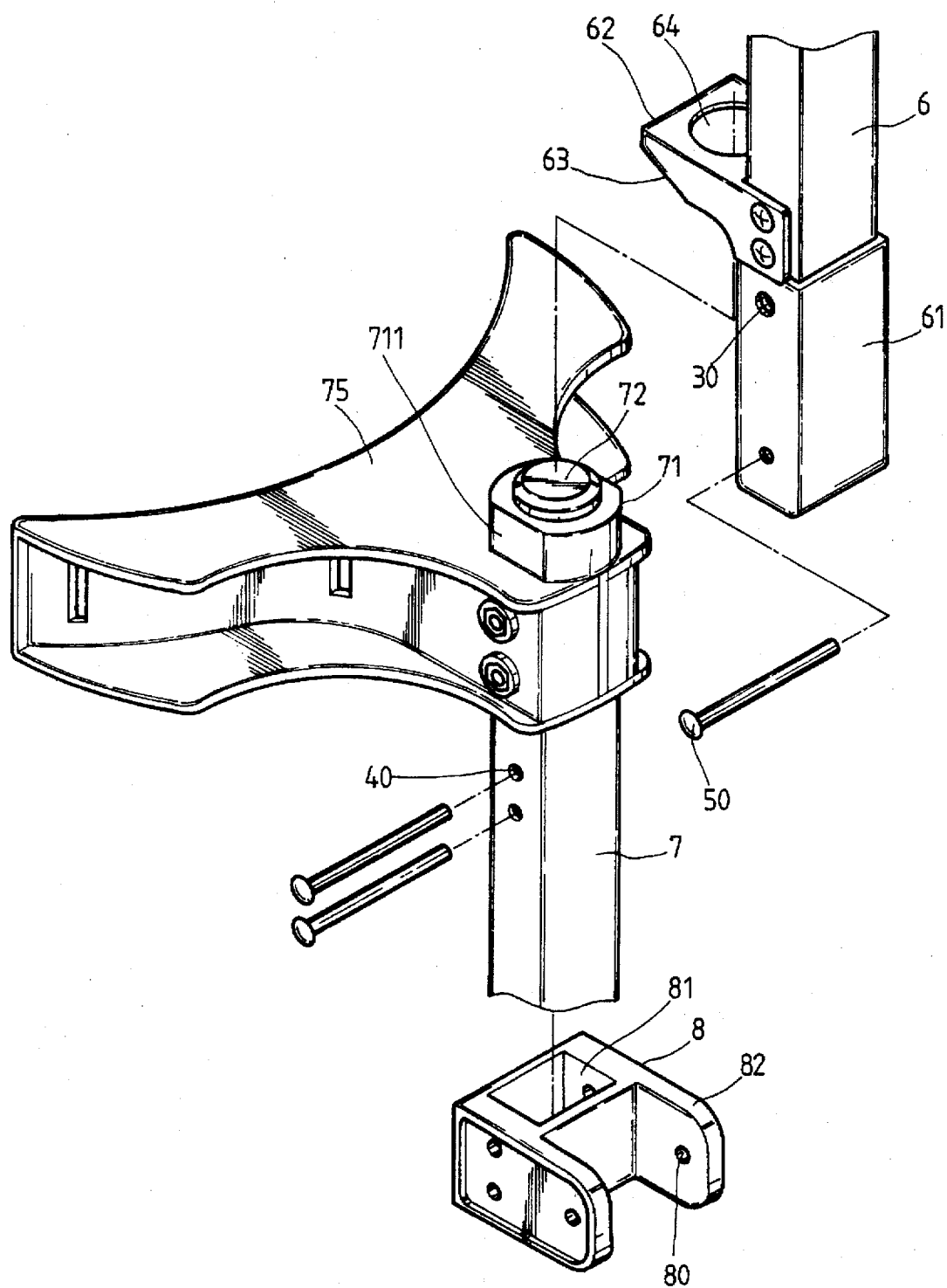
FIG. 1 is a perspective exploded view of a foldable frame assembly of a preferred embodiment in accordance with the invention.

Referring to FIGS. 1 to 5, a foldable frame assembly comprises a first frame 6, a second frame 7, a coupler 8, a hollow bracket 75, a ferrule 71, a hollow snap fastener 72 such as a snap button, and a socket pipe 61. The first frame 6 has a lower end. The socket pipe 61 is disposed on the lower end of the first frame 6 longitudinally. The socket pipe 61 has a plurality of round holes 30. A hollow press plate 62 is fastened on the lower end of the first frame 6 horizontally. The hollow press plate 62 has a snap hole 64 and a bevel 63. The ferrule 71 is disposed on the hollow bracket 75. The hollow snap fastener 72 is inserted in the ferrule 71. An elastic element 73 is inserted in the hollow snap fastener 72. A hollow seat 74 is inserted in the hollow bracket 75 beneath the elastic element 73. The second frame 7 has an upper end. The upper end of the second frame 7 is inserted in the hollow seat 74. The coupler 8 has a slot 81 and two parallel lugs 82. A plurality of through holes 80 are formed on the coupler 8. An upper portion of the second frame 7 is inserted through the slot 81. The socket pipe 61 is positioned between the parallel lugs 82. The hollow snap fastener 72 is inserted in the snap hole 64. The ferrule 71 has two parallel flat laterals 711 to match the bevel 63 while the press plate 62 is pressed down. A plurality of circular holes 40 are formed on the upper portion of the second frame 7. The coupler 8 and the upper portion of the second frame 7 are fastened by a plurality of fastening elements 50 such as rivets. The coupler 8 and the socket pipe 61 are fastened by a plurality of fastening fastening elements 50 such as rivets.

Figure 2:
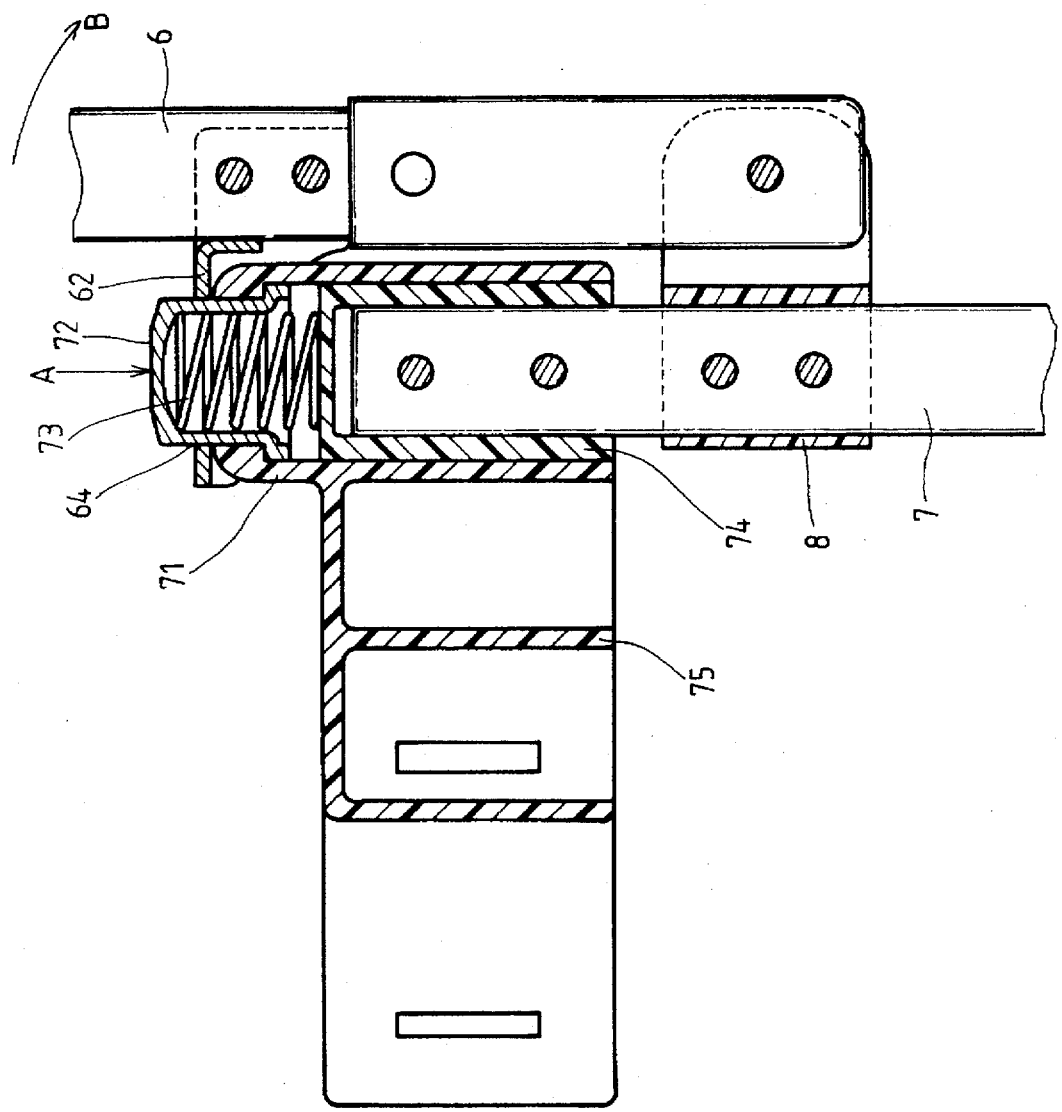
FIG. 2 is a sectional assembly view of a foldable frame assembly of a preferred embodiment in accordance with the invention while the foldable frame assembly is extended.
Figure 3:
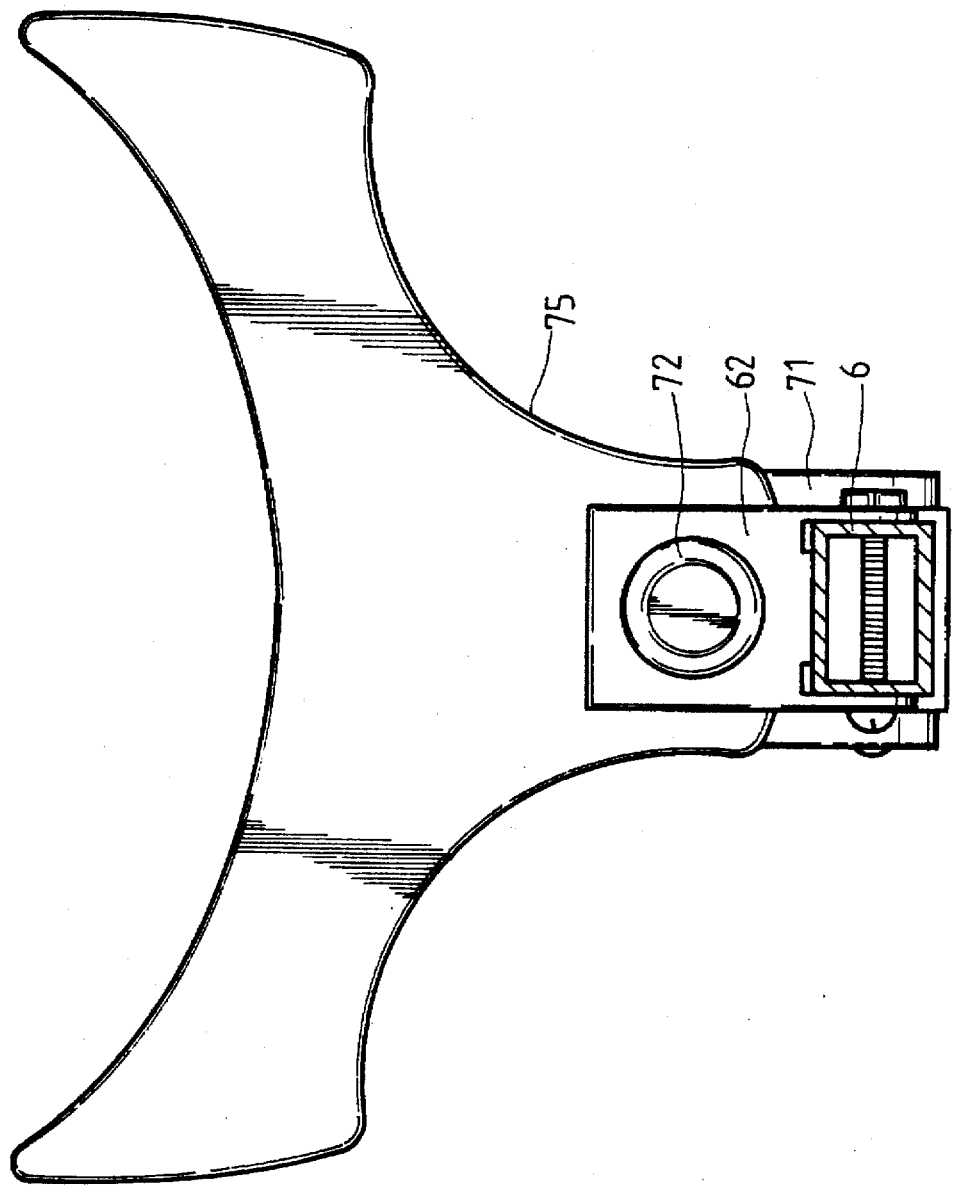
FIG. 3 is a top plan view of a foldable frame assembly of a preferred embodiment in accordance with the invention while the foldable frame assembly is extended.
Figure 4:
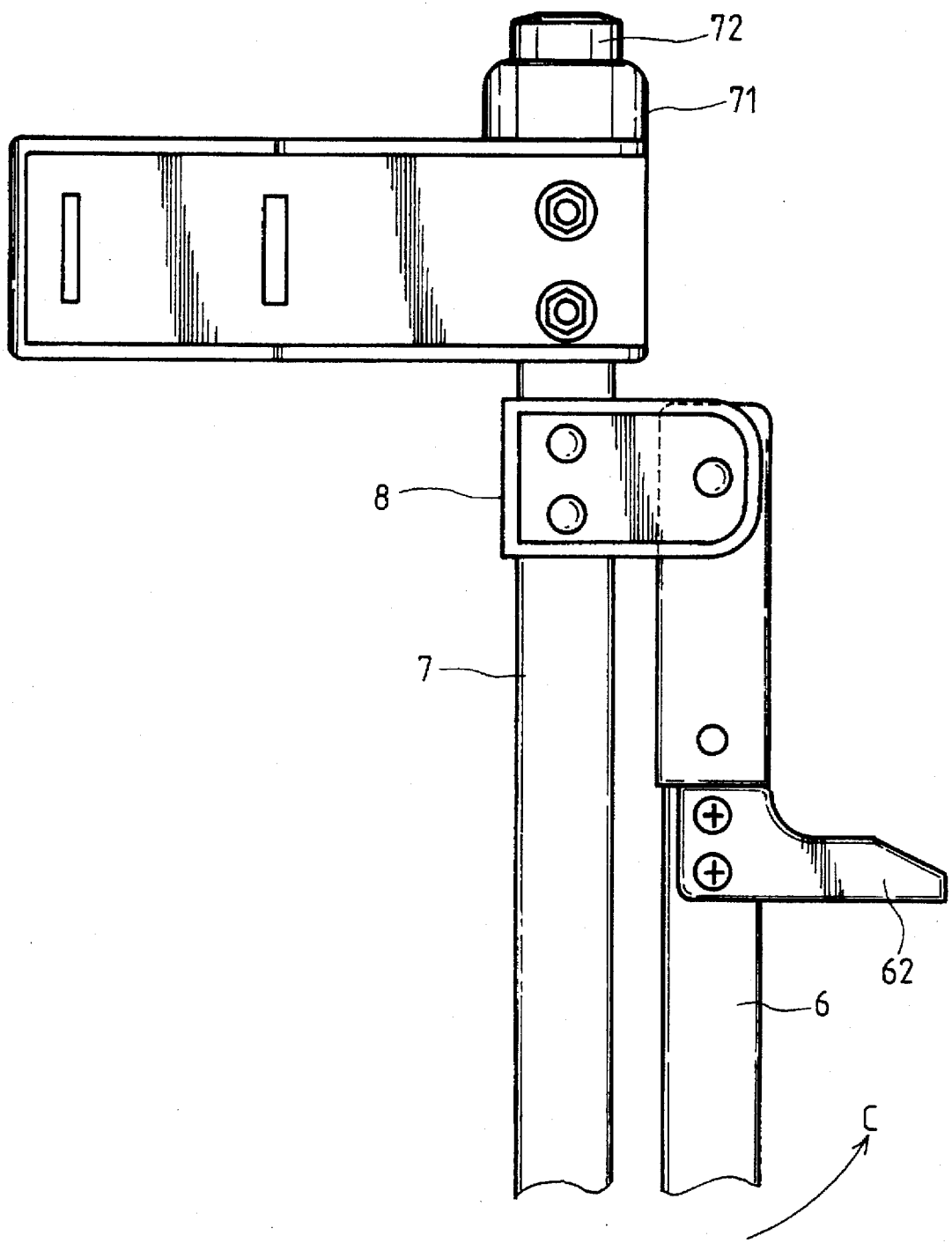
FIG. 4 is a side elevational view of a foldable frame assembly of a preferred embodiment in accordance with the invention while the foldable frame assembly is folding.

The user can press the hollow snap fastener 72 downward with one hand and rotate the first frame 6 with the other hand (as shown in FIG. 2). Thus the press plate 62 disengages from the hollow snap fastener 72. The first frame 6 can be folded toward the second frame 7 until the second frame 7 abuts the first frame 6 (as shown in FIG. 4).

Figure 5:
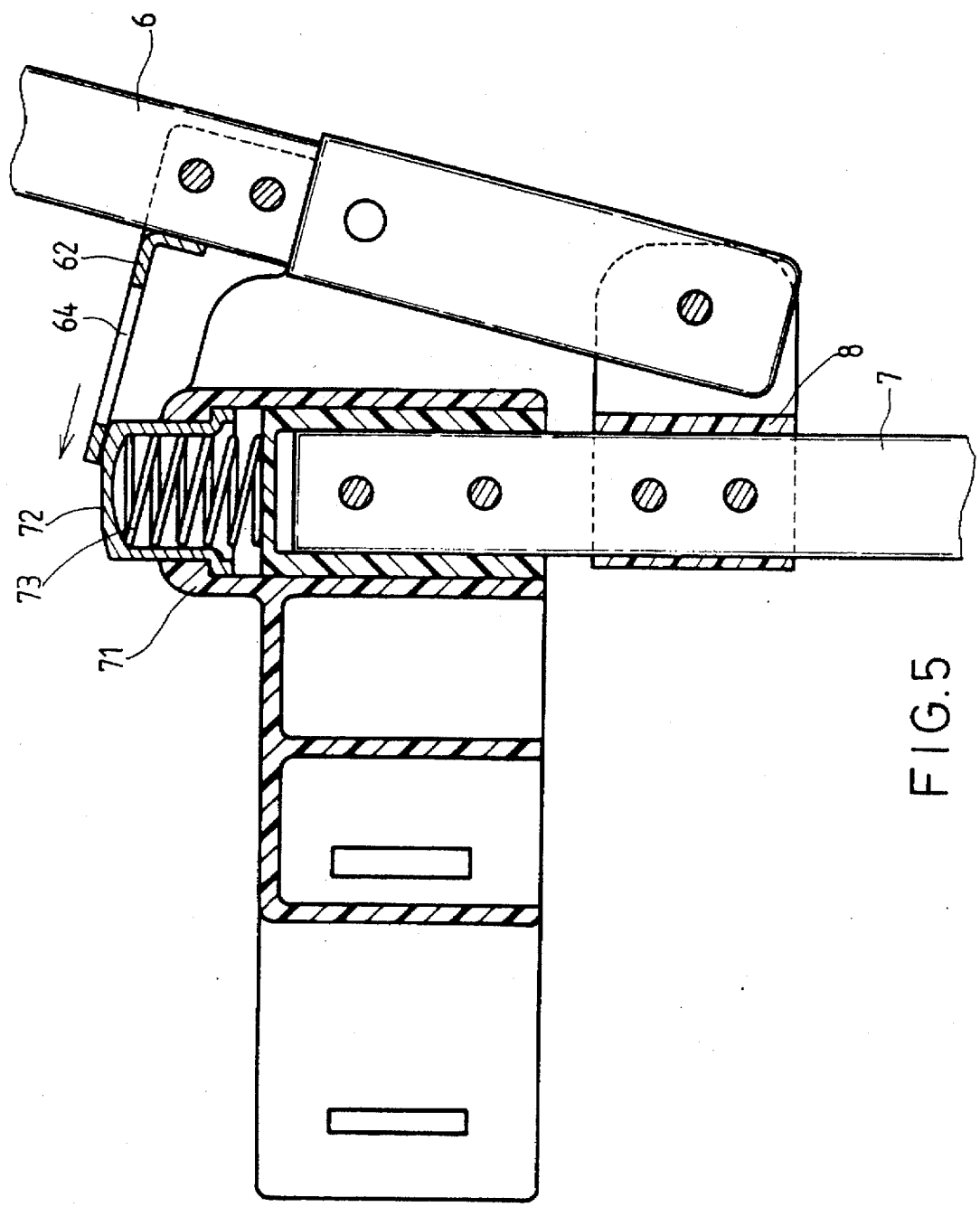
FIG. 5 is a schematic view illustrating the operation of a foldable frame assembly.

The user can rotate the first frame 6 upward until the press plate 62 contacts the hollow snap fastener 72. The user can press the hollow snap fastener 72 downward with one hand so that the snap hole 64 can match the hollow snap fastener 72 (as shown in FIG. 5). The hollow snap fastener 72 is released so that the hollow snap fastener 72 can be inserted in the snap hole 64 again.

Figure 6:
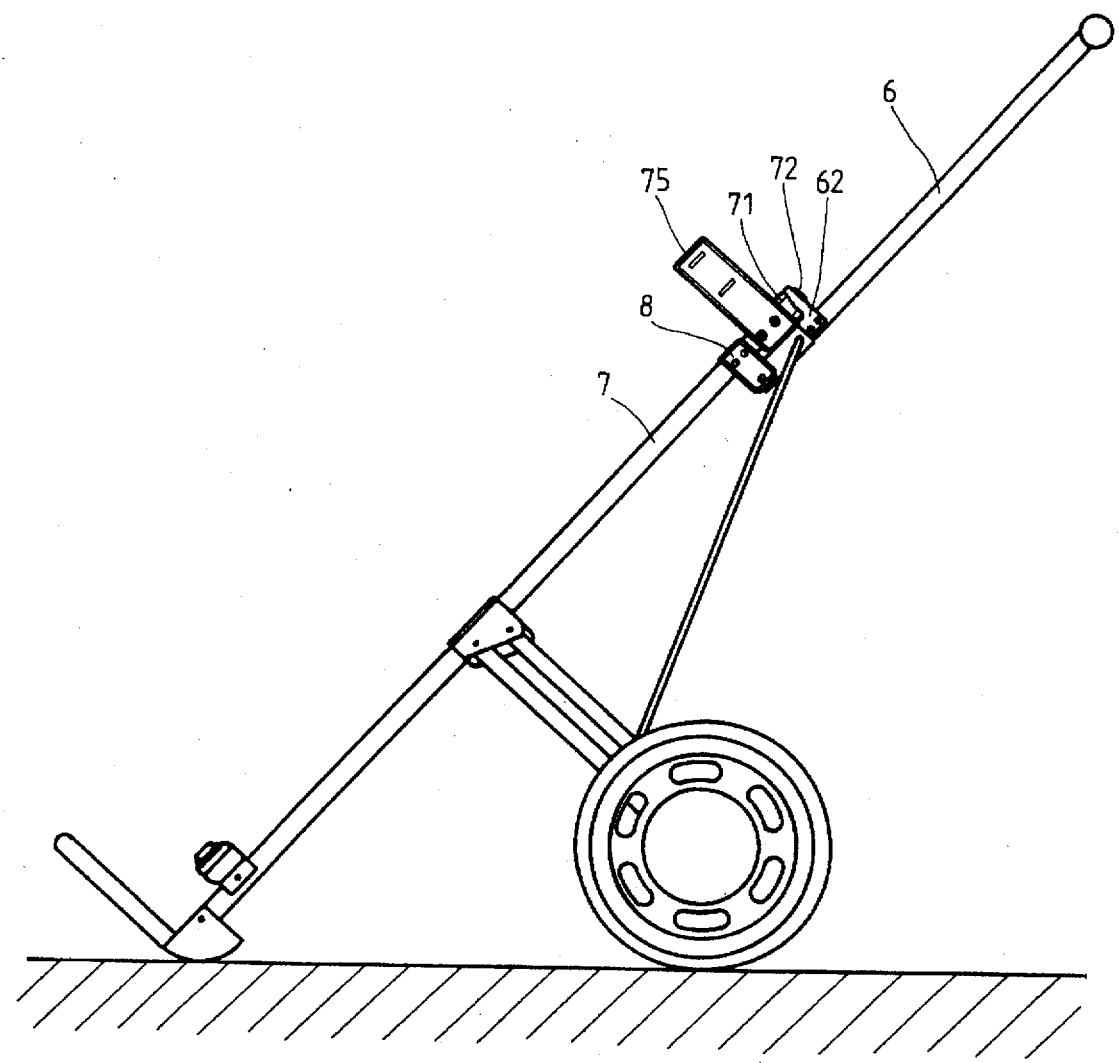
FIG. 6 is side elevational view of a golf trolley.

Referring to FIG. 6, the foldable frame assembly can connect the first frame 6 and the second frame 7 of a golf trolley.

Figure 7:
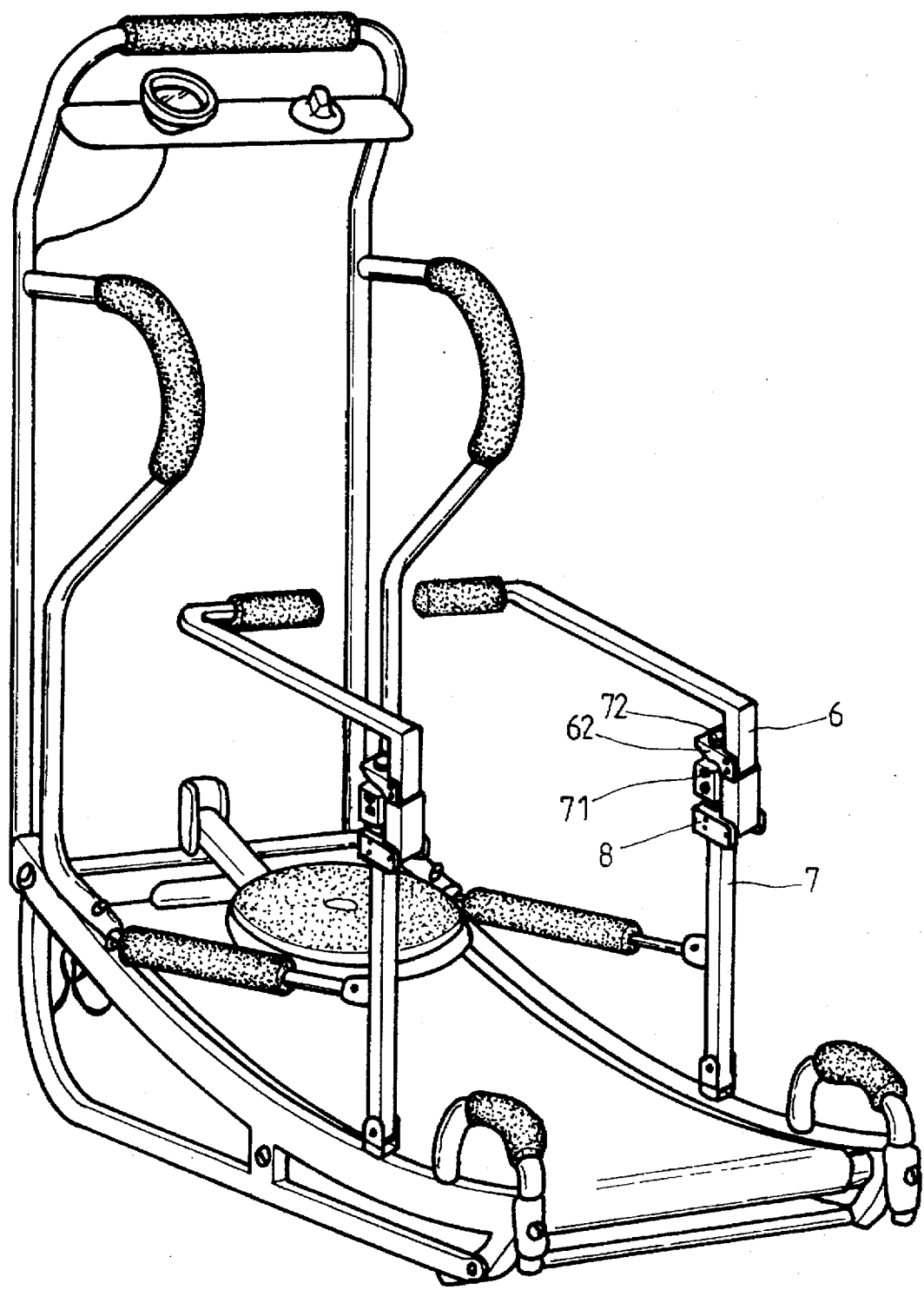
FIG. 7 is a perspective assembly view of a running exerciser.

Referring to FIG. 7, the foldable frame assembly can connect the first frame 6 and the second frame 7 of a running exerciser.

The invention is not limited to the above embodiment but various modification thereof may be made. Further, various changes in form and detail may be made without departing from the scope of the invention.

I claim:

1. A foldable frame assembly comprising:
   a first frame having a lower end,
   a socket pipe disposed on said lower end of said first frame,
   a hollow press plate is fastened on said lower end of said first frame horizontally,
   said hollow press plate has a snap hole and a bevel,
   a second frame with a hollow bracket affixed near an upper end of said second frame,
   a ferrule disposed on said hollow bracket,
   a hollow snap fastener inserted in said ferrule,
   a hollow seat disposed in said hollow bracket,
   said upper end of said second frame is received in said hollow seat,
   a coupler includes a slot and two parallel lugs,
   a plurality of through holes are formed on said coupler,
   said upper end of said second frame is inserted through said slot of said coupler and secured thereto,
   said socket pipe is positioned between said parallel lugs, and
   said hollow snap fastener is received in said snap hole wherein said socket pipe is pivotally connected to said coupler, thereby allowing said first frame to pivot with respect to said second frame, said bevel of said press plate depresses said snap fastener as said first frame and said second frame are pivoted, said snap hole of said press plate receives said fastener as said first and second frames are pivoted from a closed position to an extended position, thereby locking said first and second frames together in said extended position.

2. A foldable frame assembly as claimed in claim 1, wherein an elastic element is disposed between said hollow snap fastener and said hollow seat.

3. A foldable frame assembly as claimed in claim 1, wherein said ferrule has two parallel flat lateral sides.

4. A foldable frame assembly as claimed in claim 1, wherein said coupler and said upper end of said second frame are fastened by at least one fastening element.

5. A foldable frame assembly as claimed in claim 1, wherein said coupler and said socket pipe are fastened by at least one fastening element.

6. A foldable frame assembly as claimed in claim 1, wherein said snap fastener is a snap button.

* * * * *